United States Patent
Gao et al.

(10) Patent No.: US 12,236,661 B2
(45) Date of Patent: Feb. 25, 2025

(54) METHOD FOR GENERATING 3D REFERENCE POINTS IN A MAP OF A SCENE

(71) Applicant: Continental Automotive GmbH, Hannover (DE)

(72) Inventors: Bingtao Gao, Chengdu (CN); Tongheng Chen, Chengdu (CN); Dehao Liu, Chengdu (CN); James Herbst, Chicago, IL (US); Bo Hu, Chengdu (CN); Han Zhang, Chengdu (CN); Cheng Luo, Chengdu (CN); Hans Christian Thiel, Oberaudorf (DE)

(73) Assignee: Continental Automotive GmbH, Hanover (DE)

( * ) Notice: Subject to any disclaimer, the term of this patent is extended or adjusted under 35 U.S.C. 154(b) by 339 days.

(21) Appl. No.: 17/750,993

(22) Filed: May 23, 2022

(65) Prior Publication Data

US 2022/0398825 A1     Dec. 15, 2022

Related U.S. Application Data

(63) Continuation of application No. PCT/EP2020/083378, filed on Nov. 25, 2020.

(30) Foreign Application Priority Data

Nov. 27, 2019  (DE) .......................... 102019218323.9

(51) Int. Cl.
*G06V 10/46* (2022.01)
*G06T 7/277* (2017.01)
(Continued)

(52) U.S. Cl.
CPC ............ *G06V 10/464* (2022.01); *G06T 7/277* (2017.01); *G06T 7/70* (2017.01); *G06T 17/05* (2013.01);
(Continued)

(58) Field of Classification Search
CPC ............ G06V 10/464; G06V 2201/07; G06V 19/003; G06V 10/443; G06T 7/277;
(Continued)

(56) References Cited

U.S. PATENT DOCUMENTS 10,295,365 B2 *   5/2019   Scherer ................... G06T 7/593
10,390,003 B1 *   8/2019   Liu ....................... G01C 21/206
(Continued)

FOREIGN PATENT DOCUMENTS

EP       3447448 A1     2/2019

OTHER PUBLICATIONS

International Search Report and Written Opinion—PCT/EP2020/083378—ISA/EPO—Mar. 5, 2021.

*Primary Examiner* — Bobbak Safaipour
*Assistant Examiner* — Michael Kim Maiden
(74) *Attorney, Agent, or Firm* — Continental Automotive GmbH—LICENSED

(57) ABSTRACT

A method of complementing a map of a scene with 3D reference points including four steps. In a first step, data is collected and recorded based on samples of at least one of an optical sensor, a GNSS, and an IMU. A second step includes initial pose generation by processing of the collected sensor data to provide a track of vehicle poses. A pose is based on a specific data set, on at least one data set recoded before that dataset and on at least one data set recorded after that data set. A third step includes SLAM processing of the initial poses and collected optical sensor data to generate keyframes with feature points. In a fourth step 3D reference
(Continued)

points are generated by fusion and optimization of the feature points by using future and past feature points together with a feature point at a point of processing. This second and fourth steps provides significantly better results than SLAM or VIO methods known from prior art, as the second and the fourth steps are based on recorded data. Wherein a normal SLAM or VIO algorithm only can access data of the past, in these steps, processing may also be done by looking at positions ahead, by using the recorded data.

31 Claims, 2 Drawing Sheets

(51) Int. Cl.
| | | |
|---|---|---|
| *G06T 7/70* | (2017.01) | |
| *G06T 17/05* | (2011.01) | |
| *G06T 19/00* | (2011.01) | |
| *G06V 10/44* | (2022.01) | |

(52) U.S. Cl.
CPC .......... *G06T 19/003* (2013.01); *G06V 10/443* (2022.01); *G06T 2207/20164* (2013.01); *G06T 2207/30252* (2013.01); *G06V 2201/07* (2022.01)

(58) Field of Classification Search
CPC . G06T 7/70; G06T 17/05; G06T 2207/10016; G06T 2207/10021; G06T 7/246; G06T 19/003; G06T 2207/20164; G06T 2207/30252; G01C 21/3848; G01C 21/1656; G01C 21/20
See application file for complete search history.

(56) References Cited

U.S. PATENT DOCUMENTS

| | | | |
|---|---|---|---|
| 10,794,710 B1* | 10/2020 | Liu | ...................... H04N 13/239 |
| 2016/0062359 A1 | 3/2016 | Liao et al. | |
| 2016/0209217 A1 | 7/2016 | Babu et al. | |
| 2018/0188032 A1 | 7/2018 | Ramanandan et al. | |
| 2018/0190016 A1* | 7/2018 | Yang | ...................... G06V 20/58 |
| 2019/0050000 A1* | 2/2019 | Kennedy | ................ G05D 1/102 |

* cited by examiner

METHOD FOR GENERATING 3D REFERENCE POINTS IN A MAP OF A SCENE

CROSS-REFERENCE TO RELATED APPLICATIONS

This application is a continuation of the pending International Application No. PCT/EP2020/083378 filed on Nov. 25, 2020 and now published as WO 2021/105218, which designates the United States and claims priority from German Application No. DE 102019218323.9 filed on Nov. 27, 2019. The disclosure of each of the above-identified patent documents in incorporated by reference herein.

FIELD OF THE INVENTION

The embodiments relate to a method for generating point landmarks/3D reference points/map points for a 3D map of a scene, for example a data road map that can be used by autonomously driving vehicles.

DESCRIPTION OF THE RELATED ART

Advanced driver systems and autonomously driving cars require high precision maps of roads and other areas on which vehicles can drive. Determining a vehicle's position on a road with high accuracy which is needed for self-driving cars cannot be achieved by conventional navigation systems, such as GNSS (Global Navigation Satellite System), for example GPS, Galileo, GLONASS, or other known positioning techniques like triangulation and the like. However, when a self-driving vehicle moves on a road with multiple lanes, it is desired to exactly determine the position of the vehicle on one of the lanes.

Regarding high precision navigation, it is necessary to have access to a digital map in which objects being relevant for the secure driving of an autonomously driving vehicle are captured. Test and simulations with self-driving vehicles have shown that a very detailed knowledge of the vehicle's environment and specification of the road is required.

However, conventional digital maps of the environment of a road, which are used today in conjunction with GNSS tracking of vehicle movements may be sufficient for supporting the navigation of driver-controlled vehicles, but they are not detailed enough for self-driving vehicles. Scanning the roads with specialized scanning vehicles provides much more details, but is extremely complex, time-consuming and expensive.

In robot mapping and navigation, Simultaneous Localization And Mapping (SLAM) is known for generating a precise map of a scene. According to the SLAM procedure, a map of an unknown environment is constructed or updated while simultaneously keeping track of an agent's location within it. Another approach is sensor fusion which uses information from a plurality of sensor systems, for example a monocular camera, a satellite navigation system, such as GPS, an inertial measurement unit (IMU), etc. to provide mobile robot traces and 3D reference points for generating a map of a scene. However, the known methods to generate vehicle traces and 3D reference points have some limitations.

Especially in largescale scenes, SLAM usually does not perform well, especially over long periods of time due to the accumulated error and the lack of grain for image matching. Traditional SLAM systems use data in an online/real-time manner, and, consequently, lose some of the intrinsic value of the background data from different sensors, for example image sensors of a camera, satellite navigation sensors, sensors of an inertial measurement unit (IMU), etc. Therefore, a conventional SLAM based system may easily lose tracking for various reasons, for example images with indistinct features, and hence generate very short and unusable data.

Moreover, SLAM systems are initialized from the very beginning of the data (image data, satellite navigation data, IMU data, etc.) which may take a long time to provide usable data, especially when the initial data accuracy is not good. Basically, the known SLAM systems usually cannot perform a quick and accurate initialization.

A problem of the above-mentioned sensor fusion systems is that sensor fusion of data of different sensor systems, for example a monocular camera, a satellite navigation sensor, an inertial measurement unit sensor, etc., largely relies on the accuracy of GPS data which, however, may generate unreliable vehicle traces and 3D reference points when the GPS data suffers inaccuracies due to signal loss, blocking, etc.

SUMMARY OF THE INVENTION

The problem to be solved by the invention is to provide a method for generating point landmarks/map points/3D reference points as part of or in a map of a scene with high accuracy and with a low probability of tracking loss.

Solutions of the problem are described in the independent claims. The dependent claims relate to further improvements of the invention.

An embodiment of a method for generating point landmarks/map points/3D reference points which are part of or which are in a map of a scene which allows a map to be generated with high accuracy and nearly eliminate the chance of tracking loss is specified in claim 1.

An embodiment includes four steps. A first step includes collection of data for background or delayed processing. The vehicle collects and records samples of at least one of optical sensor or camera data like images from the environment, positional data from GNSS (Global Navigation Satellite System) which may be GPS, and data from an IMU (Inertial Measurement Unit). Further sensor data collected and recorded may include wheel ticks and/or steering angle and/or any other sensor data indicating movement characteristics of the vehicle or environmental conditions data such as ambient temperature and/or windscreen wiper status. These data are collected over a certain period of time, distance or number of samples. For example, 100 to 300 or even up to several thousand samples may be collected in 1 meter intervals. The optical sensor mentioned herein may be or may include one or more monocular cameras. It may also include other optical sensors like a stereo camera and/or a lidar and/or a radar.

A second step includes generation of a track of initial vehicle poses by processing of collected sensor data. A vehicle pose may herein also be mentioned as pose. Based on the quality of the sampled data, from each sample at least one data of image, GNSS, and IMU may be selected or at least two of image, GNSS, and IMU may be fused to provide a track of initial vehicle poses. Further a filter may be applied to provide a smooth trajectory and/or accurate initial vehicle poses. The second step is most efficient if performed after the first step and applied to the already collected data of step 1. This may allow for better filtering on a longer sequence of samples and not only based on past recorded samples. Instead, for each sample, further samples, sampled earlier and later may be used for filtering. This can only be done, when filtering already recorded data from the first step. In an embodiment, the operations of the second step may be performed with a certain delay after collecting each sample of data of the first step.

A third step includes construction of a sequence of keyframes, the keyframes including feature points generated by a SLAM algorithm or another VIO algorithm. Further, a sequence of improved vehicle poses may be generated. A feature point may be a point-shaped feature. Such a feature may be detected by image processing using appropriate feature detectors such as corner or edge detectors or others. A feature point may be described with a descriptor that describes the optical characteristics of the point-shaped feature in relation to its environment in order to detect it again from different distances or angles of an optical sensor.

This third step may be done after the second step. It may also be done with a delay after the second step, such that sufficient data is available.

This third step provides significantly better results than SLAM or VIO (Visual Odometry) methods known from prior art (which are working in a real-time fashion on latest data), as it is based on recorded and filtered initial pose data as of the second step. Further, the fourth step is also based on recorded data, as it uses future keyframes.

A fourth step includes generation of 3D reference points. Such 3D reference points are sometimes simply called 3D points or map points or point landmarks. A 3D reference point may be a point in 3D space. It may have been derived from at least one feature point in at least one 2D image. In that case, it is the same point but in 3D space, while the feature points are its view in the optical sensor images. A 3D reference point can also have a descriptor. The 3D reference points are based on the keyframes and the feature points contained therein and may further be based on their related improved poses. Each point of processing is based on a selected keyframe together with its related improved pose and uses further at least one keyframe together with its related improved pose before the point of processing and at least one keyframe together with its related improved pose after the point of processing.

3D reference points may be generated by fusion and optimization of the feature points and by optionally using improved poses. One method of doing this improvement or optimization may be bundle adjustment.

In conclusion, the method can basically be divided into two major parts. In the first part (initial pose generation) a smooth trajectory and initial/preliminary, but already accurate, track of poses of the vehicle is generated in step 2 using data sampled in step 1 of various sensor systems. In the second major part (3D reference points construction), the generated initial poses are used by a SLAM system/procedure or a visual odometry system/procedure in step 3 to provide keyframes including feature points and improved vehicle poses. Later, in step 4, these are used to construct point landmarks/map points/3D reference points while also continuously optimizing the poses and 3D reference points using proper data optimization algorithms, for example a bundle adjustment algorithm.

According to an embodiment, the initial vehicle poses are generated by using data of non-optical sensor systems, for example data of an inertial measurement unit sensor and a satellite navigation sensor.

In an embodiment, data of non-optical sensors are exclusively used.

According to a further embodiment, the initial poses of the optical sensor are generated by using data provided by an inertial measurement unit and a satellite navigation system and also by using image data of the sequence of images of the at least one optical sensor recorded in step 1.

According to another embodiment, the smooth trajectory of the initial vehicle poses may be generated in the second step by using and fusing the data of the various sensor systems based on the framework of an extended Kalman filter (EKF). Due to the nature of the EKF itself, the accuracy of multi-sensor fusion, for example the fusion of image data of the optical sensor, satellite navigation data of a satellite navigation system, and data of an inertial measurement unit, is no longer highly dependent on any particular one of these sensors, leading to a system which is more robust to noise. In particular, the accuracy of multi-sensor fusion is no longer largely dependent on GPS data accuracy. The poses may initially be generated by cinematic modelling and then optimized by several visual and physical observations.

Due to the use of an extended Kalman filter, the pose of each frame may be provided with a confidence level before running feature point construction in the third step. A confidence level can be used for SLAM initialization, thus making the initialization of the system much faster and more likely to succeed. Moreover, the consideration of the confidence level of the generated initial poses may allow unnecessary data processing to be avoided. In particular, if each generated initial pose has a confidence level, it is possible to appropriately decide when and where to initialize the feature point construction process in the third step of the method.

After initialization, each initial pose obtained from the second step (pose generation) can be used as the initial/preliminary pose for the subsequent third step of improved vehicle poses and keyframe construction, the keyframes including feature points, which step is executed by a SLAM system/procedure or a visual odometry system/procedure. Then, in a fourth step, both of improved poses and keyframes with feature points are used for point landmarks/map points/3D reference points construction and for generation of optimized vehicle poses. This can be done by applying an appropriate optimization algorithm, for example a local or global bundle adjustment algorithm. In this fourth step, also data recorded in the first step may be used, for example to check the re-projection of the generated 3D reference points into the original 2D optical sensor images in order to check and minimize the re-projection errors. The optimized point landmarks/map points/3D reference points may be used to generate or complement a map of the scene. This may be done in or after the fourth step.

In an embodiment, during bundle adjustment, constraints on a re-projection error as well as constraints on optical sensor position and rotation between poses can be imposed. As a result, the method allows to eliminate scale drift and direction deviation to guarantee the accuracy of both scale and orientation.

The method for generating 3D reference points in a map of a scene and using them for vehicle navigation may be applied, for example, in the field of autonomous vehicle navigation, autonomous underwater robot navigation or autonomous unmanned aerial vehicle (UAV) navigation.

In an embodiment, a computer in a vehicle or a mobile robot may perform any of the steps of the method disclosed herein.

Additional features and advantages are set forth in the detailed description that follows. It is to be understood that both the foregoing general description and the following detailed description are merely exemplary, and are intended to provide an overview or framework for understanding the nature and character of the claims.

DESCRIPTION OF DRAWINGS

In the following the invention will be described by way of example, without limitation of the general inventive concept, on examples of embodiment with reference to the drawings.

In FIG. 1 an embodiment is shown. As illustrated in the figure, the method for generating landmarks/3D reference points in a map of a scene may include four steps S1, S2, S3 and S4.

Figure 1:
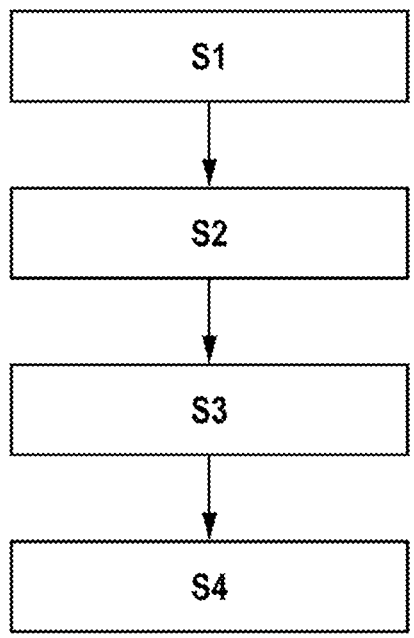
FIG. 1 shows a flowchart illustrating method steps of a method for generating point landmarks/map points/3D reference points in a map of a scene.

In a first step S1, data sets are recorded, where each data set includes data sampled of at least one optical sensor, and at least one of a GNSS (Global Navigation Satellite System), and an IMU (Inertial Measurement Unit). For example, 100 to 300 or several thousand samples may be collected in 1 meter or shorter or longer intervals. Each data set may include one sample.

In a second step S2, the collected data from the first step are processed to provide a track of initial vehicle poses. An initial vehicle pose related to a data set is based on that data set, on data sets recoded before that data set, and on data sets recorded after that data set. In other words, if an initial vehicle pose at a point of processing is based on a specific data set, the initial vehicle pose is further based on at least one data set recorded before the point of processing, and on at least one data set recorded after the point of processing.

In a real-time system, meaning a system according to prior art without recording of step 1, only data sets generated before that data set would be available. According to an embodiment, recorded data may be used which allows to access future data. By using past and future data, a smoother, continuous, plausible, and more precise track of initial vehicle poses may be generated. This pre-generated track of initial vehicle poses allows proper initialization and smooth processing of the SLAM algorithm in the next step without track loss and with high accuracy.

In a third step S3, a sequence of improved vehicle poses and keyframes is generated by a SLAM algorithm. The keyframes include feature points. Instead of a SLAM algorithm, another VIO algorithm may be used.

In a fourth step S4, 3D reference points are constructed based on feature points and improved vehicle poses from the third step. 3D reference points and optimized vehicle poses are based on a keyframe and may further be based on its related improved vehicle pose related to a point of processing, at least one keyframe and its related improved vehicle pose before the point of processing and at least one keyframe and its improved vehicle pose after the point of processing. This method, using keyframes also ahead of the point of processing allows a much more precise determination of 3D reference points/landmarks.

In an embodiment of step S2, initial vehicle poses are generated by using data of non-optical sensor systems exclusively. The initial vehicle poses may be generated, for example, by using data of an inertial measurement unit (IMU) and a satellite navigation system, for example GPS.

In step S3, feature extraction with descriptors, matching and pose improvement may be performed based on captured images of the optical sensor. Feature tracking may be performed by applying a Simultaneous Localization And Mapping (SLAM) algorithm.

In step S4, a triangulation may be performed by evaluating the generated optimized poses and results from feature extraction and matching to generate 3D points or features in 3D space.

According to an embodiment, in the fourth step S4, at least one of the generated 3D reference points, and the generated improved vehicle poses may be optimized by applying an optimization algorithm, for example, a global bundle adjustment algorithm.

In contrast to a conventional SLAM system using data in an online/real-time manner, according to the first embodiment of the method for generating 3D reference points in a map of a scene, the SLAM system is now a background system which uses data of various sensor systems already stored previously in a storage system for generating initial vehicle poses. As a result, the SLAM system evaluating the data of various sensor systems in a background manner is prevented from losing tracking, even in scenes that are very hard for real-time SLAM systems, such as scenes which have only very few features that produce feature points that can be tracked over many optical image frames. As a result, the generated track of vehicle poses, the generated sequence of keyframes, and the generated map of 3D reference points is much longer and much more accurate than what could be generated by using a conventional real-time SLAM system without pre-generation of a track of initial vehicle poses.

The approach is very appropriate for largescale scenarios generating a large road database. The SLAM system generates vehicle poses and 3D reference points precisely and efficiently due to low computational complexity. The SLAM system runs fast since the initial vehicle poses provided during pose generation are computationally more efficient. Moreover, the proposed method for generating 3D reference points in a map of a scene is robust to unreliable sensor data.

In an embodiment, initial poses of the optical sensor are generated in step S2 by using data of an inertial measurement unit (IMU) and a satellite navigation system (GNSS), for example a GPS system, and by additionally using image data of a sequence of images captured by the optical sensor. According to an embodiment, the initial poses of the optical sensor may be generated in step S2 by filtering the data of the inertial measurement unit and the satellite navigation system and the image data of the sequence of images of the optical sensor by using an Extended Kalman Filter (EKF).

In an embodiment, features may be extracted from the sequence of images and feature tracking is performed in the second step S2 by evaluating an optical flow. The initial poses of the optical sensor may be updated in step S2 based on optical flow tracking results. However, the tracking results may not be used to carry out triangulation at this stage. The feature tracking results may rather serve as a measurement information to update the initial vehicle poses. In conclusion, the feature tracking results can be understood as an epipolar constraint between images.

In an alternative embodiment, features may be extracted from the sequence of images and feature tracking is performed in the second step S2 by matching feature point descriptors, triangulation of feature points, and generating the initial vehicle poses based on the matching and triangulation results.

In an embodiment, in step S4, the generated 3D reference points and the generated improved poses of the optical sensor can be optimized by applying an optimization algorithm, for example, a local bundle adjustment algorithm.

The steps S1, S2, S3 as well as the step S4 of optimizing the generated 3D reference points and the generated vehicle poses, and the step of generating or complementing the map of the scene based on the optimized generated 3D reference points as well as all other processing steps may be performed by a processor of a computer. Such a computer may advantageously be in a vehicle but possibly also in a backend which collects the different sensor data, for example sensor data from a satellite navigation system, sensor data from an inertial measurement unit (IMU) and image data from the optical sensor, before processing them. The method for generating point landmarks/map points/3D reference points in a map of a scene may be implemented as a computer program product embodied on a computer readable medium. The computer program product includes instructions for causing the computer to execute the method steps S1 and S2 of the method for generating landmarks/3D reference points in a map of a scene.

Figure 2:
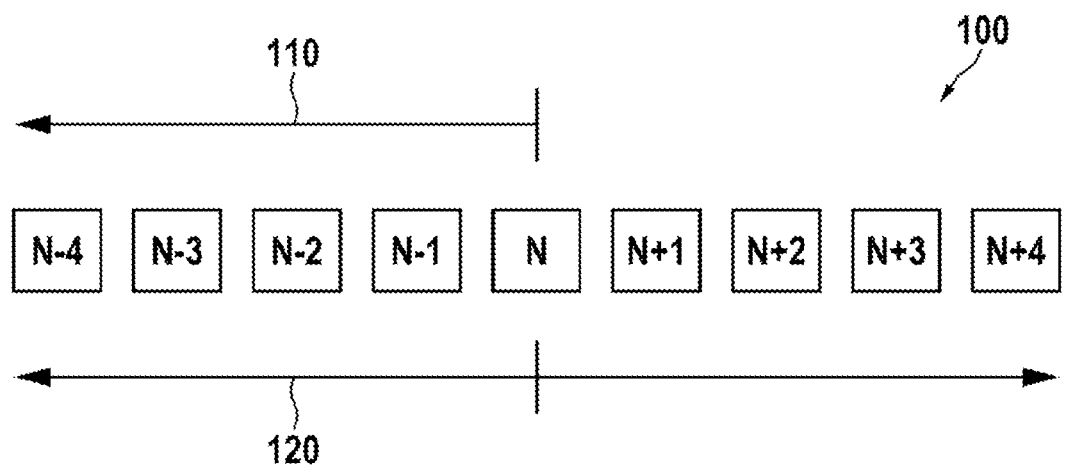
FIG. 2 shows datasets which may be accessed by SLAM algorithms.

FIG. 2 shows datasets which may be accessed by SLAM (Simultaneous Localization and Mapping) algorithms. SLAM algorithms known from prior art are used for real-time localization. Localization is combined with mapping as there is a need to have a map of an environment for a precise localization therein. A normal SLAM algorithm gets one sample of data which may contain image, GNSS and IMU information after the other. There may be a sample rate between 1/s and 60/s depending on speed and processing power. When the SLAM algorithm receives a new sample, a new calculation can be started based on the new sample and past samples. This allows only to generate a track/trajectory and a vehicle pose ending with the new sample. There may be an extrapolation from the previous samples to the new sample and a combination with the value of the new sample. This is indicated by arrow 110 indicating use of samples N, N−1, N−2, N−3, N−4 and further of the samples 100.

The method of step 2 may also access "future" samples which are ahead of the new sample, as the sensor data has already been recorded. This allows a better smoothing of the generated track. In this embodiment, no real-time localization is required, such that recorded data may be used for background mapping only. This is shown in further detail in the next figures. Further, the method step allows to access "future" keyframes. Here, the same figure may be applied by referring to keyframes instead of samples.

Figure 3:
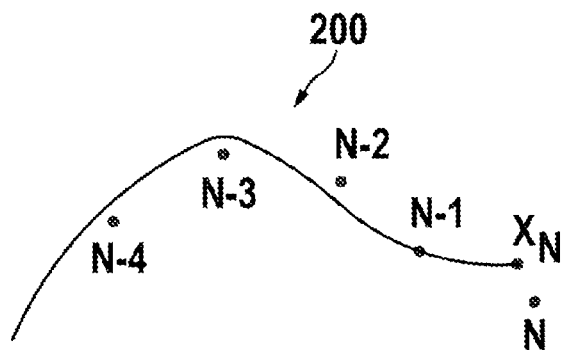
FIG. 3 shows calculation inaccuracy of a standard SLAM.

FIG. 3 shows a track of vehicle poses as known from prior art. The points N−1 to N−4 indicate past vehicle poses/positions of a trajectory 200. A SLAM may identify a new vehicle pose N while the true pose may be $X_N$.

SLAM systems as known from prior art do not function properly, if no feature points can be identified or new feature points do not match with previous feature points. Sometimes, non-optical systems like IMU or GPS can help to improve accuracy and/or to recover a lost track. But there still remain situations, where IMU and GPS do not help and a SLAM cannot initialize or recover from a lost track.

Figure 4:
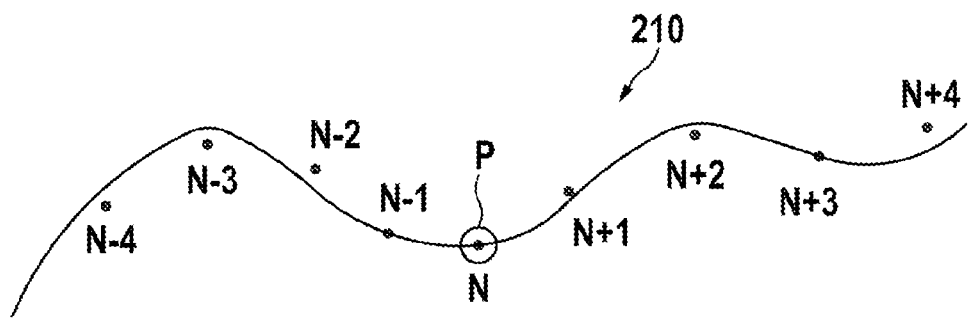
FIG. 4 shows reduced calculation inaccuracy of a modified SLAM.

FIG. 4 shows initial vehicle poses of method step 2. Here, a track of initial vehicle poses is generated based on data sets collected in the first step. For generating an initial vehicle pose P at a point of processing, which may be related to data set N, not only past data sets N−1 to N−4 but also future data sets N+1 to N+4 are used. This results in a comparatively smooth and precise track of initial vehicle poses 210.

Such a track of initial vehicle poses provides a much better initial condition for a SLAM and avoids loss of track, because it already provides a basic plausible track.

Figure 5:
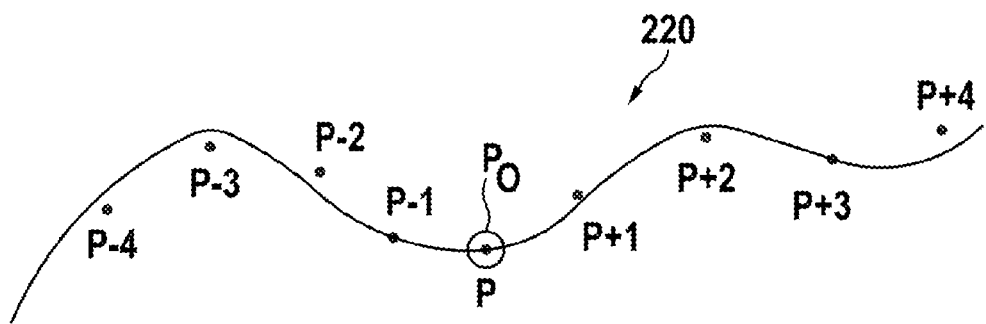
FIG. 5 shows optimized vehicle poses of method step 4.

FIG. 5 shows optimized vehicle poses of method step 4. Here, a track of optimized vehicle poses is generated based on improved vehicle poses and keyframes including feature points, of the third step. 3D reference points are generated and optimized along with the optimized vehicle poses. But for a simpler picture and better understanding they are left away in this figure. For generating an optimized vehicle pose Po at a point of processing, which may be related to improved vehicle pose and keyframe P, not only past improved vehicle poses and keyframes P−1 to P−4 but also future improved vehicle poses and keyframes P+1 to P+4 are used. This results in a comparatively smooth and precise track of improved vehicle poses 220 and 3D reference points.

The invention claimed is:

1. A method of generating 3D reference points, comprising the steps of:
    receiving data sets that include data sampled by at least one sensor, the at least one sensor including at least one of an optical sensor or a non-optical sensor;
    processing the data sets and generating a track of initial vehicle poses based on the processing of the data sets, wherein each of the initial vehicle poses is related to a point of processing, and each of the initial vehicle poses is generated based on one of the data sets recorded at the point of processing, on at least one of the data sets recorded before the point of processing, and on at least one of the data sets recorded after the point of processing;
    based on an application of a SLAM algorithm to at least a portion of the data sets and the initial vehicle poses, generating a sequence of additional vehicle poses and keyframes, the keyframes including feature points; and
    based on the feature points and the additional vehicle poses, generating 3D reference points and optimized vehicle poses, wherein each of the 3D reference points and the optimized vehicle poses is generated based on one of the keyframes and the additional vehicle poses related to a corresponding one of the points of processing, at least one of the keyframes and the additional vehicle poses before the corresponding one of the points of processing, and at least one of the keyframes and the additional vehicle poses after the corresponding one of the points of processing.

2. The method of claim 1, wherein:
    the non-optical sensor comprises an Inertial Measurement Unit (IMU), a Global Navigation Satellite System (GNSS), a wheel ticks generator, or a steering angle sensor; and
    the determining comprises generating the initial vehicle poses based on a first subset of the data sets that include data sampled by the non-optical sensor.

3. The method of claim 2, wherein the determining further comprises generating the initial vehicle poses based on image data sampled by the optical sensor, the optical sensor comprising a monocular camera, a stereo camera, a lidar unit, or a radar unit.

4. The method of claim 1, wherein the determining comprises generating the initial vehicle poses based on an application of an extended Kalman filter to the data sampled by the non-optical and to image data sampled by the optical sensor.

5. The method of claim 1, wherein:
the data sets comprise image data sampled by the optical sensor, the image data comprising a sequence of images;
the method further comprises extracting features from the sequence of images and performing feature tracking based on an evaluation of an optical flow; and
the determining comprises generating the initial vehicle poses based on the evaluation of the optical flow.

6. The method of claim 1, wherein:
the data sets comprise image data sampled by the optical sensor, the image data comprising a sequence of images;
the method further comprises extracting feature points from the sequence of images and performing feature point tracking based on a matching of feature point descriptors and on a triangulation of the feature points; and
the determining comprises generating the initial vehicle poses based on an outcome of the matching and triangulation.

7. The method of claim 1, wherein:
the data sets comprise image data sampled by the optical sensor, the image data comprising a sequence of images;
the method further comprises perform operations that extract feature points with corresponding descriptors from the sequence of images; and
generating the sequence of additional vehicle poses and keyframes comprises generating the additional vehicle poses and keyframes based on one or more of the images, the extracted feature points and descriptors, and the initial vehicle poses.

8. The method of claim 7, wherein:
the method further comprises performing feature point tracking based on a matching of the feature point descriptors and on a triangulation of the feature points; and
generating the 3D reference points comprises generating the 3D reference points based on an evaluation of the additional vehicle poses and results from the feature point tracking.

9. The method of claim 7, wherein:
the method further comprises performing feature point tracking based on a matching of the feature point descriptors and on a triangulation of the feature points; and
generating the 3D reference points comprises generating the 3D reference points based on an evaluation of the additional vehicle poses, results from feature point tracking extraction, and portions of the data sets.

10. The method of claim 1, wherein generating the 3D reference points and the optimized vehicle poses comprises: generating the 3D reference points and the optimized vehicle poses by applying an optimization process to portions of the keyframes and the additional vehicle poses, the optimization process comprising a global or local bundle adjustment process.

11. The method of claim 10, further comprising:
performing operations that generate a portion of a map of a scene based on the generated 3D reference points.

12. The method of claim 1, wherein generating the 3D reference points and the optimized vehicle poses comprises: perform operations that check a re-projection of the generated 3D reference points into data sampled by the optical sensor and that minimize re-projection errors based on the checked re-projection of the generated 3D reference points.

13. The method of claim 1, further comprising:
generating a portion of a map of a scene based on the 3D reference points and optimized vehicle poses; and
performing vehicle navigation operations based on at least the portion of the map of the scene.

14. The method of claim 1, further comprising transmitting at least a subset of the 3D reference points and optimized vehicle poses to a computing system, the computing system performing operations that generate a portion of a map of a scene based on the subset of the 3D reference points and optimized vehicle poses.

15. The method of claim 1, further comprising transmitting at least a subset of the 3D reference points and optimized vehicle poses to a vehicle, the vehicle implementing vehicle navigation operations based on the subset of the 3D reference points and optimized vehicle poses.

16. A non-transitory, machine-readable storage medium storing instructions that, when executed by at least one processor of a server, causes the at least one processor to perform operations that include:
receiving data sets that include data sampled by at least one sensor, the at least one sensor including at least one of an optical sensor or a non-optical sensor;
processing the data sets and generating a track of initial vehicle poses based on the processing of the data sets, wherein each of the initial vehicle poses is related to a point of processing, and each of the initial vehicle poses is generated based on one of the data sets recorded at the point of processing, on at least one of the data sets recorded before the point of processing, and on at least one of the data sets recorded after the point of processing;
based on an application of a SLAM algorithm to at least a portion of the data sets and the initial vehicle poses, generating a sequence of additional vehicle poses and keyframes, the keyframes including feature points; and
based on the feature points and additional vehicle poses, generating 3D reference points and optimized vehicle poses, wherein each of the 3D reference points and the optimized vehicle poses is generated based on one of the keyframes and the additional vehicle poses related to a corresponding one of the points of processing, at least one of the keyframes and the additional vehicle poses before the corresponding one of the points of processing and at least one of the keyframes and the additional vehicle poses after the corresponding one of the points of processing.

17. An apparatus comprising:
a communications interface;
a non-transitory, machine-readable storage medium storing instructions; and
at least one processor coupled to the communications interface, and the non-transitory, machine-readable storage medium, the at least one processor being configured to execute the instructions to:
receive data sets that include data sampled by at least one sensor, the at least one sensor including at least one of an optical sensor or a non-optical sensor;
process the data sets and generate a track of initial vehicle poses based on the processed data sets, wherein each of the initial vehicle poses is related to a point of processing, and each of the initial vehicle poses is generated based on one of the data sets recorded at the point of processing, on at least one of the data sets recorded before the point of processing, and on at least one of the data sets recorded after the point of processing;

based on an application of a SLAM algorithm to at least a portion of the data sets and the initial vehicle poses, generate a sequence of additional vehicle poses and keyframes, the keyframes including feature points; and based on the feature points and additional vehicle poses, generate 3D reference points and optimized vehicle poses, wherein each of the 3D reference points and the optimized vehicle poses is generated based on one of the keyframes and the additional vehicle poses related to a corresponding one of the points of processing, at least one of the keyframes and the additional vehicle poses before the corresponding one of the points of processing and at least one of the keyframes and the additional vehicle poses after the corresponding one of the points of processing.

18. The apparatus of claim 17, wherein:
the non-optical sensor comprises an Inertial Measurement Unit (IMU), a Global Navigation Satellite System (GNSS), a wheel ticks generator, or a steering angle sensor; and
the at least one processor is further configured to execute the instructions to generate the initial vehicle poses based on a first subset of the data sets that include data sampled by the non-optical sensor.

19. The apparatus of claim 18, wherein the at least one processor is further configured to execute the instructions to generate the initial vehicle poses based on image data sampled by the optical sensor, the optical sensor comprising a monocular camera, a stereo camera, a lidar unit, or a radar unit.

20. The apparatus of claim 17, wherein the at least one processor is further configured to execute the instructions to generate the initial vehicle poses based on an application of an extended Kalman filter to the data sampled by the non-optical sensor and to image data sampled by the optical sensor.

21. The apparatus of claim 17, wherein:
the data sets comprise image data sampled by the optical sensor, the image data comprising a sequence of images; and
the at least one processor is further configured to execute the instructions to:
extract features from the sequence of images and performing feature tracking based on an evaluation of optical flow; and
generate the initial vehicle poses based on the evaluation of the optical flow.

22. The apparatus of claim 17, wherein:
the data sets comprise image data sampled by the optical sensor, the image data comprising a sequence of images; and
the at least one processor is further configured to execute the instructions to:
extract feature points from the sequence of images and performing feature point tracking based on a matching of feature point descriptors and on a triangulation of the feature points; and
generate the initial vehicle poses based on an outcome of the matching and triangulation.

23. The apparatus of claim 17, wherein:
the data sets comprise image data sampled by the optical sensor, the image data comprising a sequence of images; and
the at least one processor is further configured to execute the instructions to:
extract feature points with corresponding descriptors from the sequence of images; and
generate the additional vehicle poses and keyframes based on one or more of the images, the extracted feature points and descriptors, and the initial vehicle poses.

24. The apparatus of claim 23, wherein the at least one processor is further configured to execute the instructions to:
perform feature point tracking based on a matching of the feature point descriptors and on a triangulation of the feature points; and
generating the 3D reference points comprises generating the 3D reference points based on an evaluation of the additional vehicle poses and results from the feature point tracking.

25. The apparatus of claim 23, wherein the at least one processor is further configured to execute the instructions to:
perform feature point tracking based on a matching of the feature point descriptors and on a triangulation of the feature points; and
generate the 3D reference points based on an evaluation of the additional vehicle poses, results from feature point tracking extraction, and portions of the data sets.

26. The apparatus of claim 17, wherein the at least one processor is further configured to execute the instructions to generate the 3D reference points and the optimized vehicle poses by applying an optimization process to portions of the keyframes and the additional vehicle poses, the optimization process comprising a global or local bundle adjustment process.

27. The apparatus of claim 26, wherein the at least one processor is further configured to execute the instructions to perform operations that complement a map of a scene based on the generated 3D reference points.

28. The apparatus of claim 17, wherein the at least one processor is further configured to execute the instructions to perform operations that check a re-projection of the generated 3D reference points into data sampled by the optical sensor and that minimize re-projection errors based on the checked re-projection of the generated 3D reference points.

29. The apparatus of claim 17, wherein the at least one processor is further configured to execute the instructions to
generate a portion of a map of a scene based on the 3D reference points and optimized vehicle poses; and
perform vehicle navigation operations based on at least the portion of the map of the scene.

30. The apparatus of claim 17, wherein the at least one processor is further configured to execute the instructions to transmit at least a subset of the 3D reference points and optimized vehicle poses to a computing system, the computing system performing operations that generate a portion of the map of the scene based on the subset of the 3D reference points and optimized vehicle poses.

31. The apparatus of claim 17, wherein the at least one processor is further configured to execute the instructions to transmit at least a subset of the 3D reference points and optimized vehicle poses to a vehicle, the vehicle implementing vehicle navigation operations based on the subset of the 3D reference points and optimized vehicle poses.

* * * * *